(12) United States Patent
Gupta et al.

(10) Patent No.: US 8,369,598 B2
(45) Date of Patent: Feb. 5, 2013

(54) METHOD FOR IDENTIFYING A PATHOLOGICAL REGION OF A SCAN, SUCH AS AN ISCHEMIC STROKE REGION OF AN MRI SCAN

(75) Inventors: Varsha Gupta, Singapore (SG); Bhanu K N Prakash, Singapore (SG); Wieslaw L. Nowinski, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 897 days.

(21) Appl. No.: 12/518,119

(22) PCT Filed: Dec. 5, 2007

(86) PCT No.: PCT/SG2007/000416
§ 371 (c)(1),
(2), (4) Date: Jun. 23, 2009

(87) PCT Pub. No.: WO2008/069762
PCT Pub. Date: Jun. 12, 2008

(65) Prior Publication Data
US 2010/0021035 A1    Jan. 28, 2010

Related U.S. Application Data

(60) Provisional application No. 60/873,019, filed on Dec. 6, 2006.

(51) Int. Cl.
*G06K 9/00* (2006.01)
(52) U.S. Cl. .......................... 382/131; 382/171; 600/407
(58) Field of Classification Search .................. 382/131, 382/171; 600/407
See application file for complete search history.

(56) References Cited

U.S. PATENT DOCUMENTS

| 6,430,430 | B1 | 8/2002 | Gosche |
| 6,466,687 | B1* | 10/2002 | Uppaluri et al. ............... 382/128 |
| 6,584,216 | B1 | 6/2003 | Nyul et al. |
| 7,409,085 | B2* | 8/2008 | Hu et al. ........................ 382/171 |
| 8,125,223 | B2* | 2/2012 | K.N. et al. ..................... 324/309 |
| 2003/0009098 | A1 | 1/2003 | Jack et al. |
| 2008/0292194 | A1* | 11/2008 | Schmidt et al. ............... 382/217 |

FOREIGN PATENT DOCUMENTS

| WO | 03060827 | 7/2003 |
| WO | 2005057498 | 6/2005 |
| WO | 2006028416 | 3/2006 |

OTHER PUBLICATIONS

Dastidar et al., "Volumetric measurements of right cerebral hemisphere infarction: use of a semiautomatic MRI segmentation technique", 2000, Computers in Biology and Medicine 30, 41-54.*

(Continued)

*Primary Examiner* — Chan S Park
*Assistant Examiner* — Katrina Fujita
(74) *Attorney, Agent, or Firm* — Cantor Colburn LLP

(57) ABSTRACT

A method for identifying a pathological region of a scan (such as a stroke region within a MRI DWI volume scan) is proposed. A region of the scan which is likely to contain pathological tissue (e.g. infracted tissue) is identified by obtaining a parameter which, for a given slice, or portion of a slice, characterizes the distribution of the intensity of pixels, e.g. the relative proportion of high intensity pixels. In a first case, such a parameter is used to identify those slices of a volume scan which are likely to include infarction. In a second case, such a parameter (hemisphere parameter) is obtained for each of the left- and right-hemispheres of a brain, to estimate which hemisphere contains the stroke. In either case, the parameter may be calculated based on ranges, percentiles and functions of the percentiles of the intensity distribution. These ranges, percentiles and functions of the percentiles are not pre-defined but are selected to maximize sensitivity.

25 Claims, 14 Drawing Sheets

OTHER PUBLICATIONS

International Search Report PCT/SG2007/000416; Dated Feb. 11, 2008.

Bhanu Prakash, "Identification, Segmentation, and Image Property Study of Acute Infarcts in Diffusion-Weighted Images by Using a Probabilistic Neural Network and Adaptive Gaussian Mixture Model", Academic Radiology, vol. 13, No. 12, Dec. 2006, pp. 1474-1484.

* cited by examiner

METHOD FOR IDENTIFYING A PATHOLOGICAL REGION OF A SCAN, SUCH AS AN ISCHEMIC STROKE REGION OF AN MRI SCAN

REFERENCE TO RELATED APPLICATION

This application is related to our U.S. Provisional Patent Application No. 60/873,019 the contents of which are hereby incorporated herein by reference as if disclosed herein in their entirety.

TECHNICAL FIELD

The present invention relates to a method for identifying within a scan, a pathological region. The scan may be of any kind in which there is difference of intensity between normal and pathological regions. It particularly relates to a method for identifying brain scan slices that may include an acute ischemic stroke region, a method for distinguishing a brain hemisphere having the stroke region, and systems and software for performing the methods.

BACKGROUND

An infarct is an area of tissue which undergoes necrosis as a result of obstruction of local blood supply. Ischemic strokes are caused by infarction. Following an acute ischemic stroke, swift identification of the infarcted/stroke region is critical to patient outcome. It is known to perform a magnetic resonance (MR) technique known as diffusion-weighted imaging (DWI) to form an image of a region thought to include a stroke region. The DWI generates a whole volume scan consisting of a plurality of scans slices including the suspected stroke region.

Automatic computerized stroke region identification techniques have been proposed, aimed at reducing detection and analysis time compared to manual data processing by an expert, which may further be subject to human error and observer bias. Literature describes many computerized segmentation techniques aimed at reducing total time required for stroke segmentation. For example, Martel et al., MICCAI, 1679, 22-31, 1999 used a semi-automatic method to determine infarct volume by diffusion tensor-MRI. An adaptive threshold algorithm incorporating a spatial constraint was used to segment the images. Li et al., Neuroimage, 23, 1507-1518, 2004 proposed an unsupervised segmentation method using multi-scale statistical classification and partial volume voxel reclassification for diffusion tensor MR images.

To further reduce the time taken to process scan data, it is desirable to reduce the scanned volume to be studied before performing actual segmentation of the stroke regions, so as to narrow the focus of study and avoid the labour of analysing the whole volume. However, it is important that the method for reducing the volume should have high sensitivity so as not to lose information by compromising on specificity.

SUMMARY

The present invention aims to provide new and useful techniques for identifying regions within volume scans slices which are likely to contain infarction.

The present invention proposes in general terms that a region of a DWI scan (or other scan in which there is difference of intensity in normal and pathological regions) which is likely to contain infarcted tissue is identified by obtaining a parameter characterising the distribution of the intensities of the pixels (i.e. the shape of the intensity distribution curve).

A first aspect of the invention proposes in general terms that those slices of a volume scan which are likely to include infarction (or other pathological region) are identified by obtaining such a parameter for each slice, and selecting a range of slices for which this parameter has values indicative of a relatively high number of high intensity pixels.

A second aspect of the invention proposes in general terms that an estimate is made of whether infarction is in the left- or right-hemisphere of a brain is made by obtaining such a parameter for each hemisphere, and identifying the hemisphere including the stroke as the hemisphere for which this parameter has values indicative of a relatively high number of high intensity pixels.

In either case, the parameter may be calculated based on ranges of the intensity distribution. These ranges are preferably not pre-defined but are selected to maximise sensitivity.

A first specific expression of the invention is a method for identifying, within volume scan comprising a sequence of a plurality of scan slices and in which there is difference of intensity between normal and pathological regions, a subset of said scan slices which include pathological tissue, each scan slice being an image composed of respective intensity values for each of an array of pixels, the method comprising:
  (a) obtaining a respective slice parameter for each slice, the slice parameter characterising the distribution of the intensities of the pixels of the corresponding slice;
  (b) plotting a curve of the slice parameter for the sequence of scan slices; and
  (c) identifying said scan slices which include pathological tissue using the curve, as a range of slices for which the corresponding slice parameter indicates that there is a relatively high number of high intensity pixels.

A second specific expression of the invention is a method for determining, within a volume scan of a brain comprising a plurality of scan slices and in which there is difference of intensity in normal and pathological regions like, which hemisphere of the brain contains the pathological region, the method comprising:
  (a) dividing each of the scan slices into a left-hemisphere pixel set and a right-hemisphere pixel set;
  (b) obtaining a respective hemisphere parameter for each of the left-hemisphere and right-hemisphere pixel sets of each slice, the hemisphere parameter characterising the distribution of the intensities of the pixels of the corresponding slice in the corresponding hemisphere; and
  (c) determining whether the pathological region is in the left hemisphere or the right hemisphere according to whether the average of the hemisphere parameter over the scan slices is higher for the left-hemisphere pixel sets or the right-hemisphere pixel sets.

Another expression of the invention is a computer system programmed to perform a method according to the invention. This may be any general purpose computer.

Another expression of the invention is a computer program product carrying computer program instructions which may be read by a computer (e.g. any general computer) to cause the processor of the computer to perform a method according to the invention.

BRIEF DESCRIPTION OF THE DRAWINGS

In order that the present invention may be fully understood and readily put into practical effect, an embodiment of the invention will now be described by way of non-limitative example, the description being with reference to the accompanying illustrative drawings, in which.

DETAILED DESCRIPTION OF THE PREFERRED EMBODIMENTS

Figure 12:
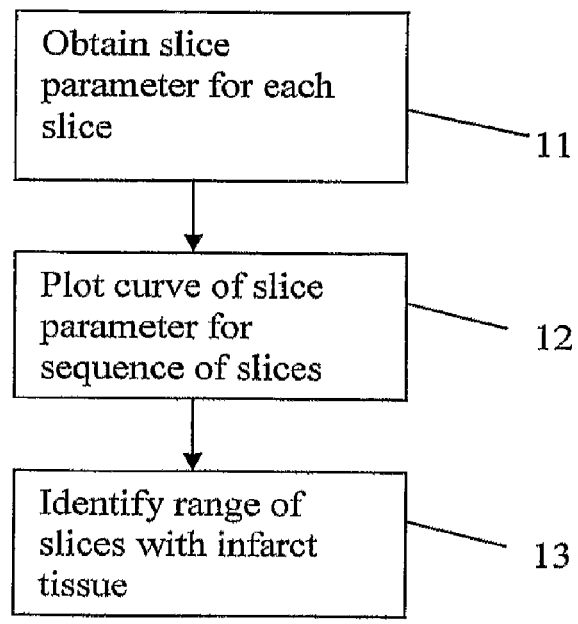
FIG. 12 shows steps of a first algorithm of the embodiment.
Figure 13:
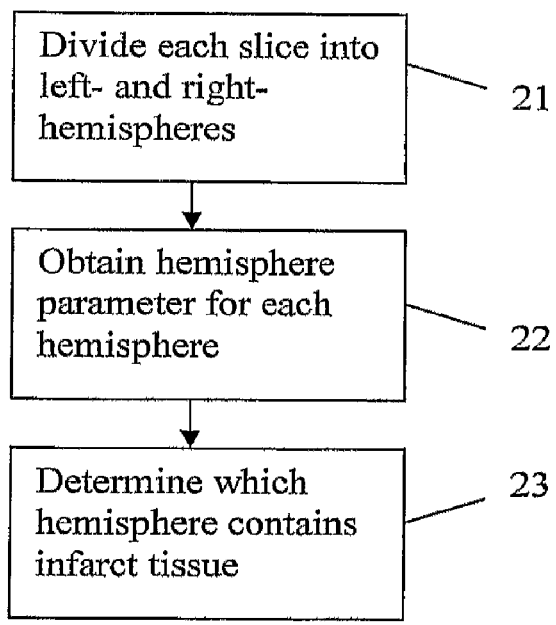
FIG. 13 shows steps of a second algorithm of the embodiment.

A method which is an exemplary embodiment of the invention will now be described. The method is for identifying a stroke region based on characteristics of normalized pixel intensity histograms. The method includes an algorithm suitable for use as a pre-processing tool to identify probable stroke scan slices from a plurality of scan slices of a whole volume and to eliminate non-stroke slices. The steps of this method are shown in FIG. 12. The method also includes an algorithm suitable for identifying the brain hemisphere (whether the left- or right-hemisphere) containing the stroke region. The steps of this method are shown in FIG. 13.

Optionally, the embodiment could be followed by further computational processes. Examples of such processes are steps of removal of false-positive results, and of segmentation artefacts.

The method is based on the fact that the pixels within the stroke region have higher intensity compared to normal tissue regions, such that there are more bright pixels in stroke slices compared to non-stroke slices in a given volume. The method assumes that the stroke occurs only in one hemisphere and that artifacts are symmetric so that brightness caused by artifacts is substantially equal in both brain hemispheres.

The method will be explained by reference to how it is used to process real data sets. Data from 36 patients (cases) comprising 36 DWI scan volumes were obtained from three different sources (13 from a first source, one from a second source and two from a third source, two from a fourth source and 18 from the fifth source) so that results were not biased to any particular instrument. Each DWI scan volume comprised a plurality of scan slices. The DWI scans had in-plane resolutions of from 0.9 mm×0.9 mm to 2.4 mm×2.4 mm, and slice thickness of 4 mm to 14 mm. The number of slices in each DWI scan volume ranged from 4 to 36. A total of 791 scan slices were obtained. Of these, an expert manually identified 264 slices as actually including a stroke. These slices are referred to here as the "ground truth" (GT) slices.

First Stage: Identifying Slices Containing Probable Infarction

Figure 14:
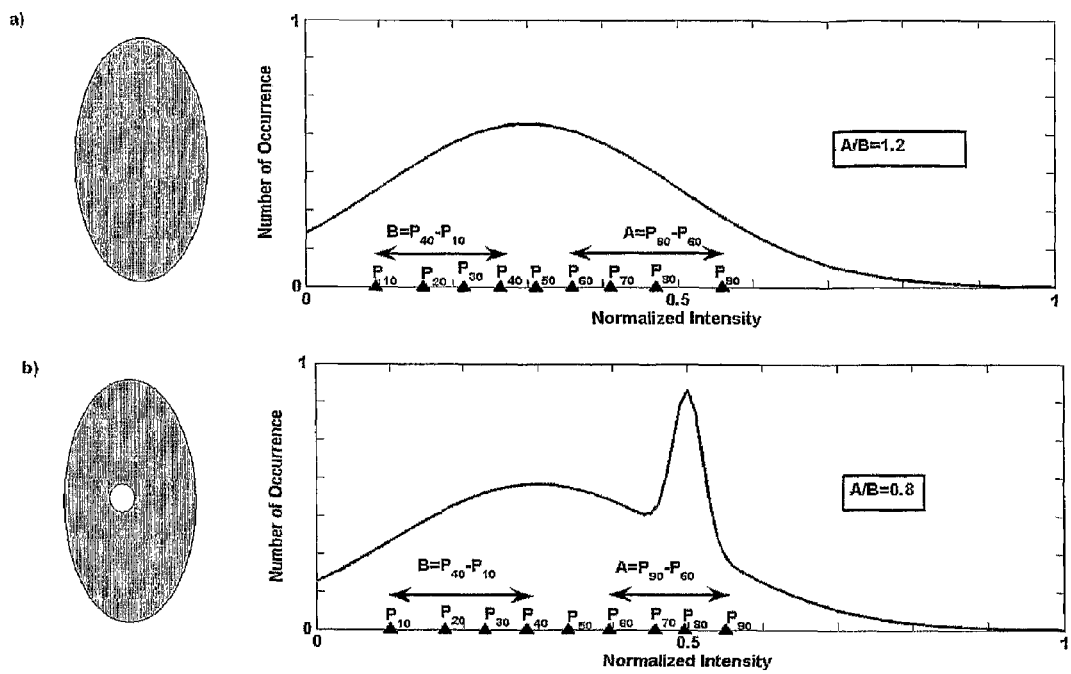
FIG. 14 composed of FIG. 14(a) which is synthetic image with a distribution of isointense pixels and its intensity histogram, and FIG. 14(b) which is a synthetic image with a few isointense pixels replaced by hyperintense pixels and its intensity histogram.

The concept of the algorithm is understood using the following example: Consider the scan image shown at the left of FIG. 14(a), which does not contain an infarct. This image has the intensity distribution of isointense pixels shown at the right of FIG. 14a. Let us write the n-th percentile of the intensity distribution as $P_n$. A ratio A/B (=1.2) is calculated where, A=$P_{90}$-$P_{60}$, and B=$P_{40}$-$P_{10}$. An infarct image, such as the scan at the left of FIG. 14(b), can be considered as a fraction of isointense pixels replaced by the hyperintense pixels. Referring to its intensity histogram, at the right of FIG. 14(b), we observe that the ratio A/B (=0.8) decreases. This happens because the number of hyperintense pixels increases which causes the separation of higher percentiles to decrease. At the same time, decrease in isointense pixels causes the separation of lower percentiles to increase. We also observe that the median intensity increases when the isointense pixels are replaced by hyperintense pixels. This concept of change in percentile density is applied to identify the infarct slices in the embodiment.

Prior to further processing, for each of the DWI scan volumes, each of the plurality of scan slices is normalized. This is so as to have a uniform intensity range in all 791 slices, in all 36 scan volumes. Normalization is done using equation (1):

$$I_{norm} = f * \frac{I - I_{min}}{I_{max} - I_{min}} \quad (1)$$

where $I_{max}$ is the maximum intensity and $I_{min}$ is the minimum intensity of each slice and f is the normalization parameter. In our study we selected f=1 (it may be any other number also) so that the maximum intensity is 1 and the minimum intensity is 0. The histograms of all the images have been plotted with 256 bins (it may be any other number also).

A histogram of normalized pixel intensity for each of the plurality of scan slices is then obtained.

Figure 1:
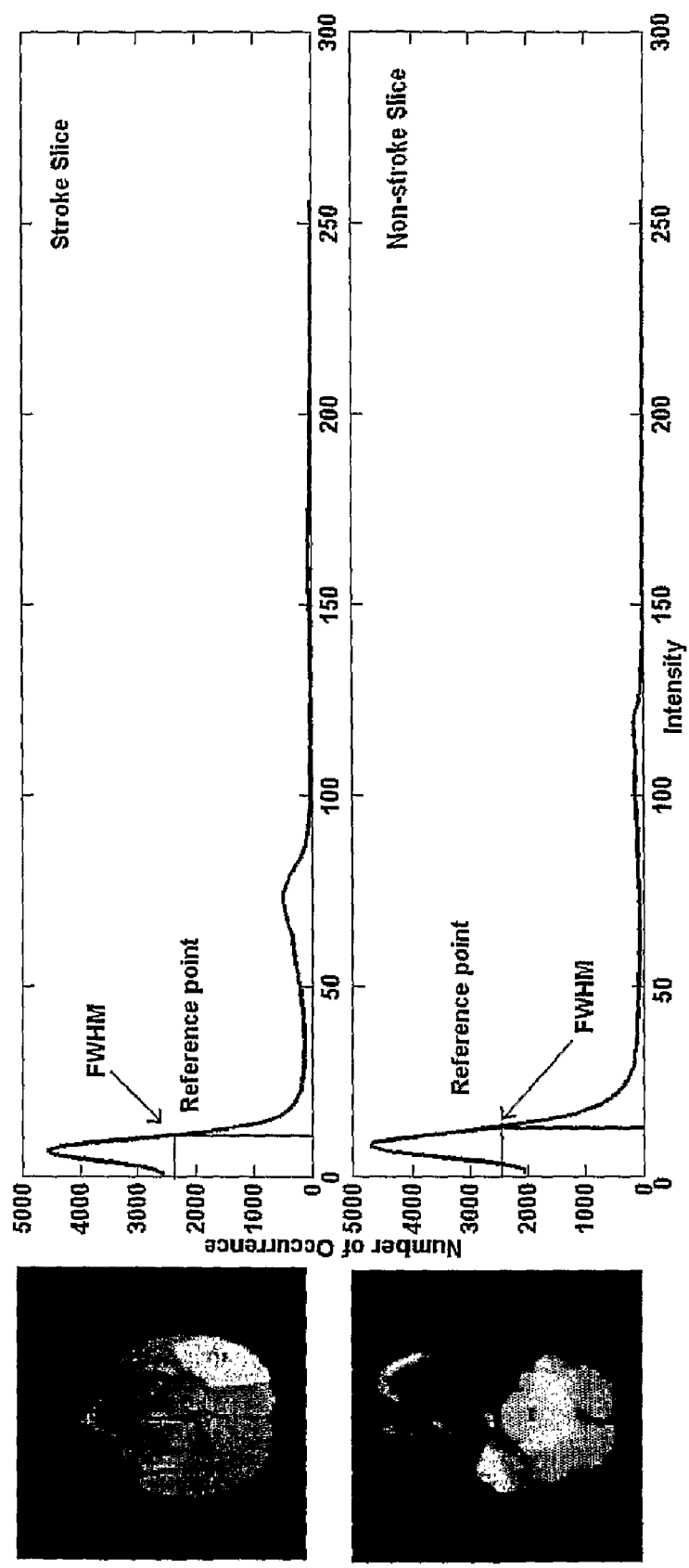
FIG. 1 is composed of FIG. 1(a), which is a slice of a DWI volume scan of a brain subject to a stoke, FIG. 1(b), which shows an image of a slice of a DWI image of a brain not subject to a stoke, and FIGS. 1(c) and 1(d), which are respectively normalized pixel intensity histograms of the slices of FIGS. 1(a) and 1(b)

FIG. 1(a) shows a normalised image of a slice including a stroke, while FIG. 1(b) shows a normalised image of a slice not including a stroke (the presence/absence of a stroke in these slices was decided manually). FIGS. 1(c) and 1(d) show the respective normalized pixel intensity histograms 102, 122.

Pixel intensities lower than a reference point were then excluded in order to exclude the effects of the darkest pixels, the majority of which are background pixels. The reference points for the images of FIGS. 1(a) and 1(b) are shown on FIGS. 1(c) and 1(d) as 104, 124. The reference points 104, 124 are selected at the Full Width Half Maxima (FWHM) of the background peak 106, 126.

Subsequently the remaining pixels were used to derive intensity percentiles ($P_{10}$, $P_{20}$ ... $P_{90}$). $P_{50}$ is the median normalized pixel intensity. At this first stage, the focus is on extracting scan slices with bright pixels, even if the bright pixels turn out to be artifact pixels. This is so as to identify probable stroke scan slices among the plurality of scan slices for a given volume. In this method, the brighter regions in a slice are taken to be those above $P_{50}$, and darker regions are taken to be those below $P_{50}$.

Figure 2:
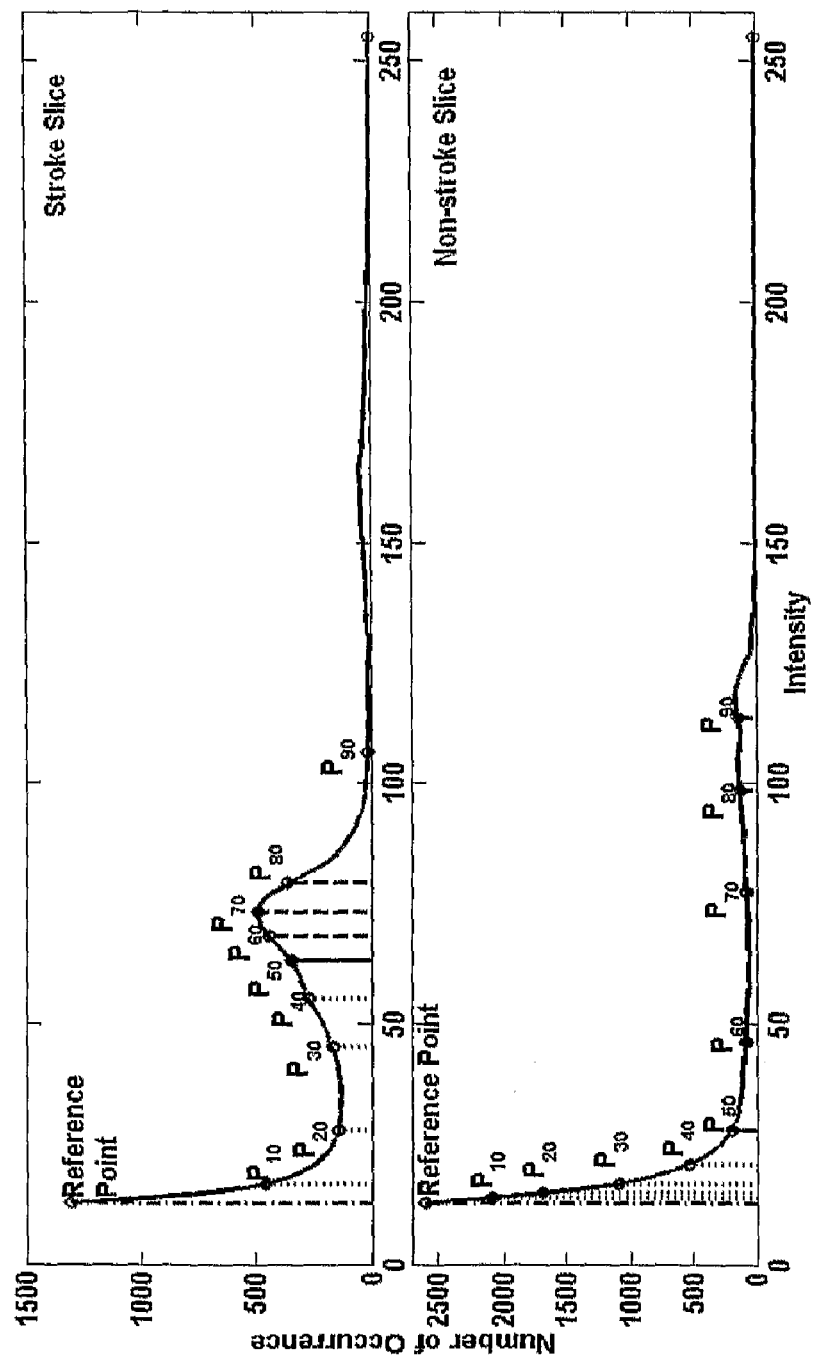
FIG. 2 is composed of FIGS. 2(a) and 2(b), which are portions of the histograms of FIGS. 1(c) and 1(d) with various percentile points marked.

The intensity percentiles are marked on intensity histograms of the remaining pixels, as shown in FIGS. 2(a) and 2(b). As can be seen in FIG. 2(b), a histogram for a non-stroke slice FIG. 1(b) contains very few pixels that are much brighter than the $90^{th}$ percentile (>$P_{90}$). FIG. 2 also shows the percentiles to be mainly located in regions 20a, 22a where the histogram is highest, rather than regions 20b, 22b where the histogram is not as high. FIGS. 2(a) and 2(b) thus have differing distributions of the percentiles, particularly the bright and dark regions of each histogram.

Referring to FIG. 2(a), the median 205 of the histogram of FIG. 2(a) is higher than the median 225 of the histogram of FIG. 2(b). Furthermore, the increased number of brighter pixels results in a decrease in the spacing of the higher percentiles 20a, and conversely in an increase in the spacing of the lower percentiles 20b.

The method employs a parameter R which indicates this difference. There are many possible choices for such a parameter.

Since stroke pixels show a distribution of brightness, they may occur in different brightness bands. It is therefore preferable not to calculate R based on a fixed intensity band. Instead, for each of the plurality of scan slices of a given volume, a range of R is calculated, where, instead of taking the whole band above $P_{50}$ as a bright region and the whole band below $P_{50}$ as a dark region, a smaller range of pixel intensity bands is used.

In a preferred embodiment, a "bright band" and a "dark band" of the histogram are defined such that we include intensities from near darkest pixels to near brightest pixels. Each is a range of intensities, such that the two ends of the range are the intensities corresponding to percentiles of the intensity distribution differing by, say, 20% (other choices than 20% are possible also). The value of 20% is chosen to ensure that there are a significant number of pixels in each band. Slice parameter R may therefore preferably be given as:

$$R = \left(\frac{1}{P_{50}}\right)\left(\frac{P_{b+20} - P_b}{P_{d+20} - P_d}\right) \quad (2)$$

where b>50 and d<50. $P_{b+20}-P_b$ is termed the "bright band difference", referring to the intensity different of the top and bottom end of the "bright band" of the histogram; $P_{d+20}-P_d$ is termed the "dark band difference", referring to the intensity difference of the top and bottom ends of the "dark band" of the histogram. An increase in number of brighter pixels results in an overall decrease in the value of the slice parameter R.

Table 1 shows the values of b and d used in an experimental test of the present method.

TABLE 1

Percentile bands for different values of b and d.

| Percentile Bands | Value of b | Value of d |
|---|---|---|
| B1 | 60 | 10 |
| B2 | 70 | 10 |
| B3 | 60 | 20 |
| B4 | 70 | 20 |

Figure 3:
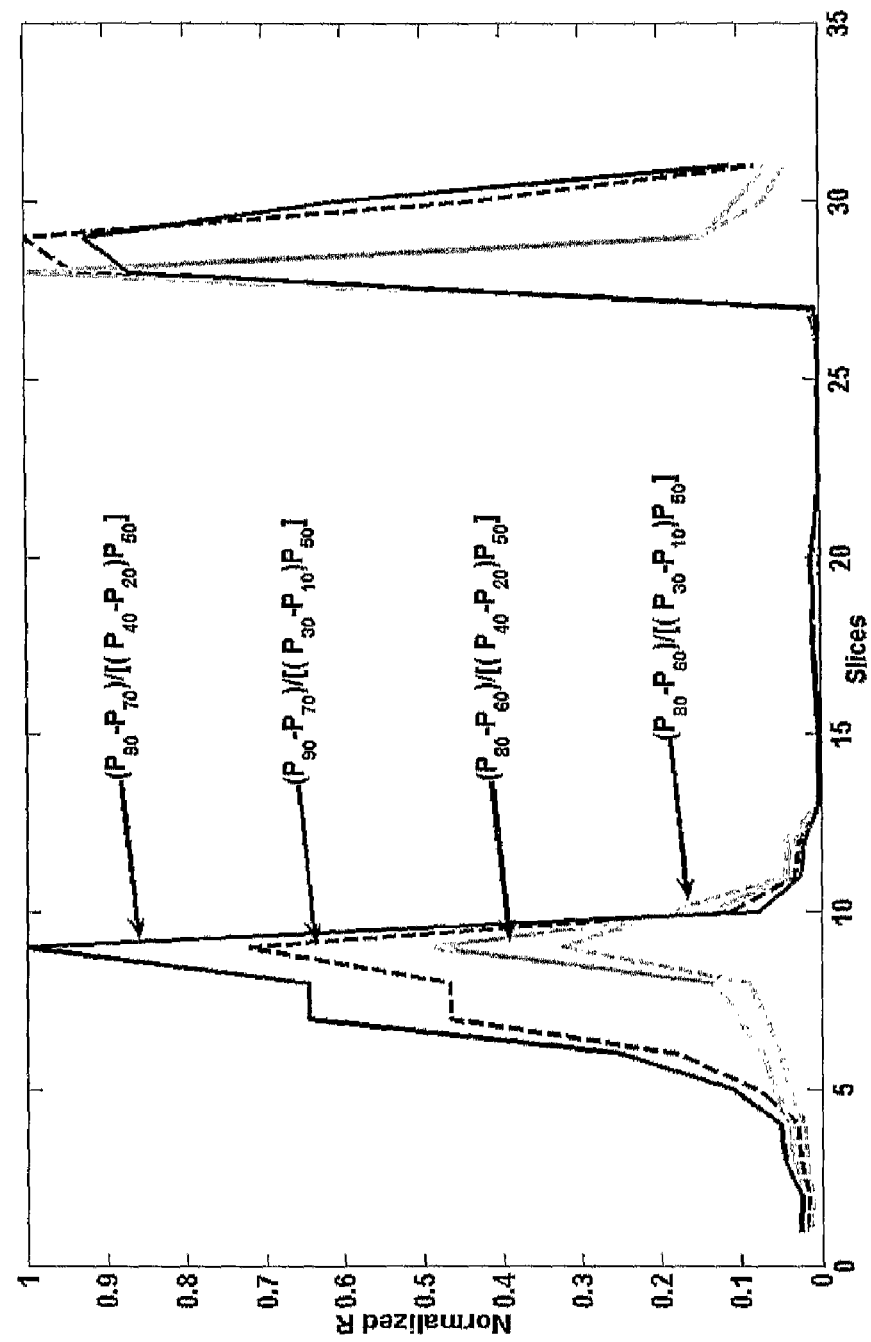
FIG. 3 is a graph of the values of four slice intensity parameters for the slices of a given volume scan.

For each of the four sets (B1 to B4) of parameters given by Table 1, the value of R is found for each slice of a scan volume known to include infarcted material (step 11 of FIG. 12) and plotted as a histogram (step 12 of FIG. 13). FIG. 3 shows the results, with each line corresponding to a respective one of the sets of parameters. Irrespective of which set of parameters is chosen, the graph of R contains a flat portion 35 in each curve, corresponding to probable stroke scan slices.

Figure 4:
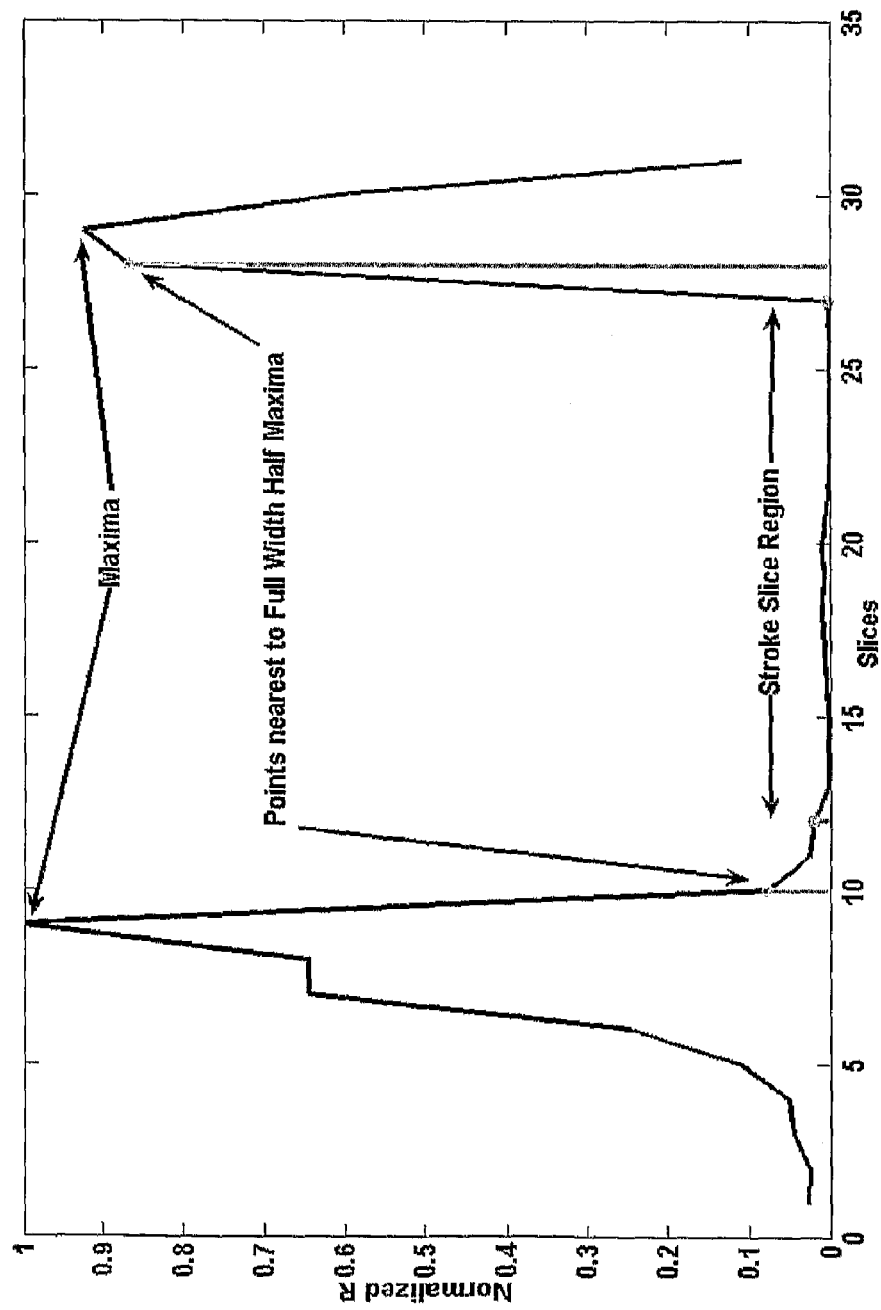
FIG. 4 is the graph of FIG. 3, indicating probable stroke scan slices.

An algorithm to locate the flat portion 45 (step 13 of FIG. 13) is shown in FIG. 4. Starting from the maxima 41, 42, the full half width maxima (FVHM) in the direction towards a flat region 45 are found (i.e. the FWHM between the peaks 41, 42). The slices 43, 44 closest to these FWHM are found towards the flat region. For each of these two slices 43, 44, we perform a respective search, starting at the slice and moving slice-by-slice towards the centre of the flat portion 45. At each slice we estimate the slope of the parameter R, taking into account the values of R at that point and to either side, waiting until the slope becomes almost zero. Specifically, considering the search starting at the slice 43, the first slice encountered where the slope is flat (which, specifically, is defined as when the slope is greater than a pre-defined value, e.g. −0.01) is considered a first extremum 47. Similarly, the search (in the reverse direction) from the slice 44 locate a second extremum 48 as the first slice encountered where the slope is flat (which, specifically, is defined as when the slope is greater than a pre-defined value, e.g. −0.01).

This procedure is repeated for the curve of R for each of the four sets of parameters (B1-B4 as shown in Table 1) to define a respective flat portion 45 bound by the first extremum 47 and the second extremum 48.

The flat region 45 is observed because the values of the slice parameter R in slices with brighter pixels are very small compared to slices with fewer brighter pixels. For a given volume, using the various possible definitions of R, i.e., for different values of b and d, will select a slightly different number of probable stroke scan slices. So as not to lose any probable stroke scan slices, the flat region 45 is selected according to the definition of R which results in a flat region 45 including a maximum number of slices. That is, the region 45 in FIG. 4 including a maximum number of slices is considered to be the set of most probable stroke scan slices: [max (Number_of_Slices_in_$B_i$)]. The flat region corresponds to lower values of R in the volume. Therefore, by the definition of R, this region is associated with the slices having a higher number of hyperintense pixels. We thus hypothesize that the infarct slices in a volume lie in the flat region.

If the number of slices in a volume is less (e.g. 8), we use a threshold based approach (since peak and valley are difficult to form when the number of slices is small) to identify infarct slices. The slice is considered to contain an infarct if R<x % of the max(R in a volume). In our study we choose x=10 but it may be any number. It should be noted that the embodiment would also function almost as well if, instead of using these four possible definitions of F, it used only a single slice parameter R selected to be any of the four possibilities of Table 1.

To verify the effectiveness of the embodiment, all 36 scan volumes with a total of 791 slices were analyzed. Of these there were 264 ground truth slices (i.e. stroke slices marked manually by an expert). The ratio of actual stroke slices to total number of slices was 0.33.

Figure 5:
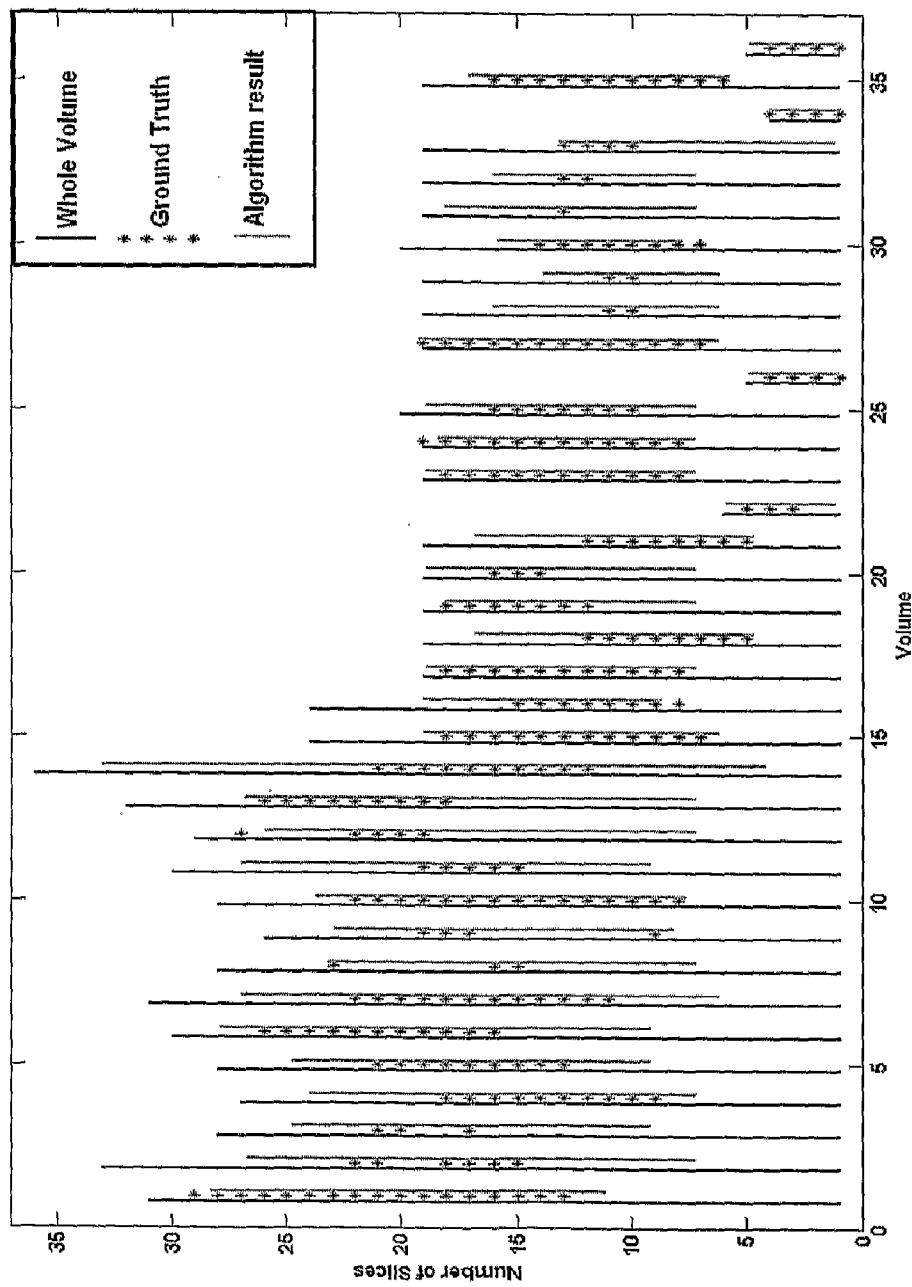
FIG. 5 is a graphical comparison, for 36 experimental scan volumes, of the stroke slice region estimated by an expert and by the embodiment.

Using the algorithm explained above, a respective flat portion 45 was obtained for each scan volume, and the scan slices not in this volume were then eliminated. This resulted in 515 slices (termed "probable stroke scan slices") remaining, including 259 of the 264 ground truth slices mentioned above. The ratio of the number of remaining slices which are ground truth slices, to total number of remaining slices, is thus 0.50. The results of this processing are shown in FIG. 5 in which the horizontal axis labels the 36 scan volumes (which are numbered from 1 to 36 in an arbitrary order), and the vertical axis labels the successive slices of each volume. The solid vertical lines 51 indicate, for respective scan volumes, the slices the respective scan volume contains (these are numbered from 1 up to the total number of slices in the scan volume; for example, scan volume 1 contains 31 consecutive slices, so the vertical line 51 corresponding to the first scan volume extends from 1 to 31). For each scan volume, the set of stars 52 represent the ground truth stroke slices, and the broken lines 53 represent the slices identified by the algorithm as probably containing infarction (i.e. the broken lines 53 show the extent of the respective flat region 45 of the respective R curve with the widest flat region 45).

The effectiveness of the embodiment is evaluated using parameters called "Sensitivity", "Specificity" and "Dice index". The Sensitivity, Specificity and Dice Indices were evaluated with reference to the ground truth slices, and are defined as follows:

$$\text{Dice Index} = \frac{2TPS}{(FPS + 2TPS + FNS)}$$

where A is the slices identified by the algorithm as belonging to the flat region, and B is the number of ground truth slices;

$$\text{Sensitivity} = \frac{TPS}{(TPS + FNS)} * 100$$

$$\text{Specificity} = \frac{TNS}{(TNS + FPS)} * 100$$

where
TPS is the number of True Positive Slices, i.e. ground truth slices identified as infarct slices by the algorithm;
FPS is the number of False Positive Slices, i.e. slices which are not ground truth slices but are identified as infarct slices by the algorithm;
TNS is the number of True Negative Slices, i.e. slices which are not ground truth slices and also identified as non-infarct slices by the algorithm; and
FNS is the number of False Negative Slices, i.e. ground truth slices not identified by the algorithm as infarct slices.

The Dice Index (DSI) of individual images is proposed as to quantify the overlap between the ground truth slices and the slices identified by the method, according to the principles set out in Kelly et al. "Statistical Validation of Image Segmentation Quality Based on Spatial Overlap Index", Academic Radiology, 11:178-189, 2004.

Figure 6:
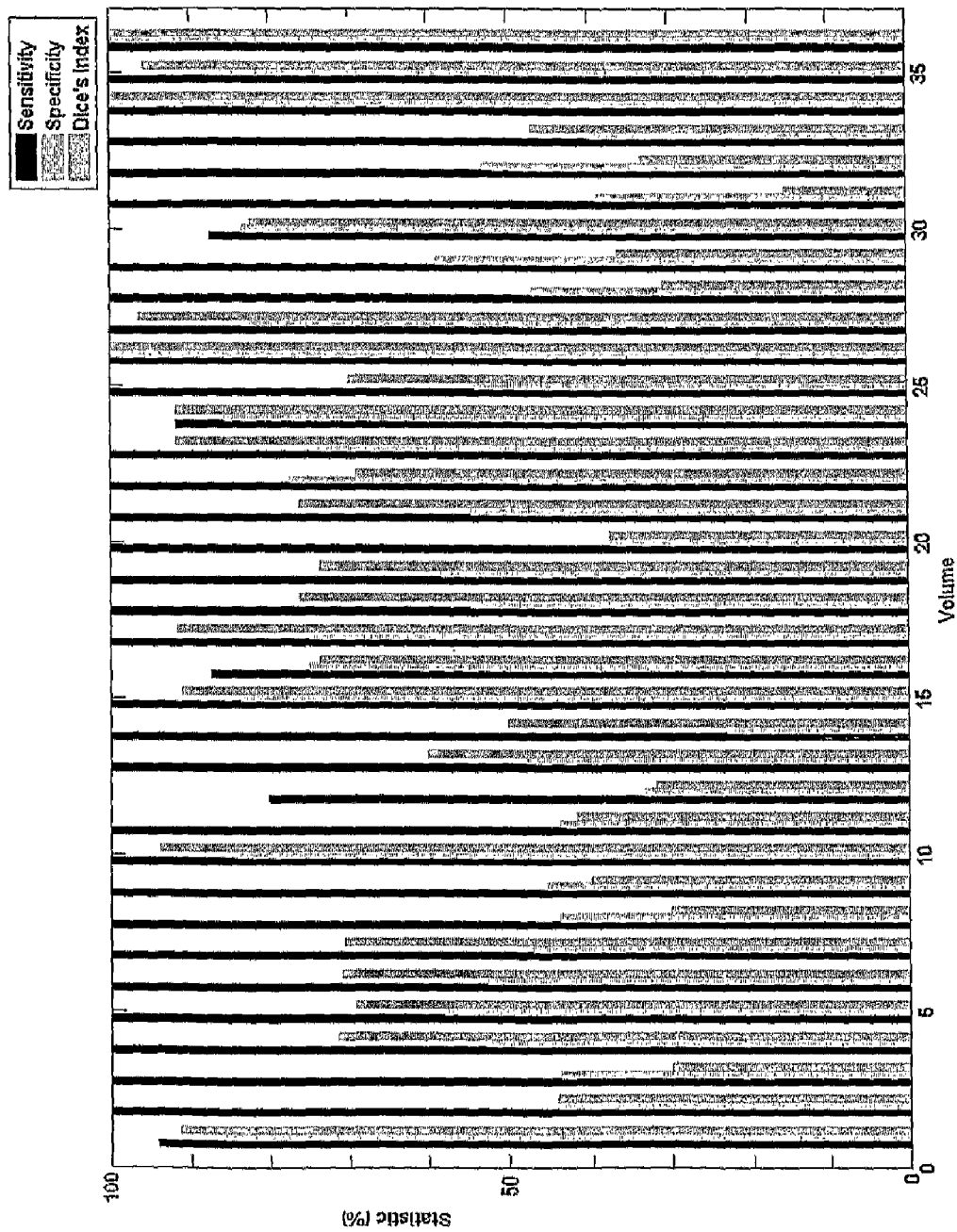
FIG. 6 shows a statistical spread of sensitivity, specificity and dice index for the 36 experimental slice volumes.

FIG. 6 shows a comparison of Sensitivity (indicated by the black bars), Specificity (indicated by the dark gray bars) and Dice Index (indicated by the light gray bars) for all 36 scan volumes. The first stage processing detects the probable stroke scan slices in a volume with 98.1% sensitivity and 51.4% specificity. The average Dice Index is 0.665. As can be seen, sensitivity is 100% in almost all cases. This is important because a pre-processing stage prior to segmentation should have high sensitivity so that almost all the stroke slices are retained. Specificity is low in cases which have small stroke area.

Optionally, the present algorithm could be supplemented by a step of confirming the presence of a stroke using another method with high specificity, such as Griner et al. "Selection and Interpretation of Diagnostic Tests and Procedures", Annals of Internal Medicine, 94:555-600.

Figure 7:
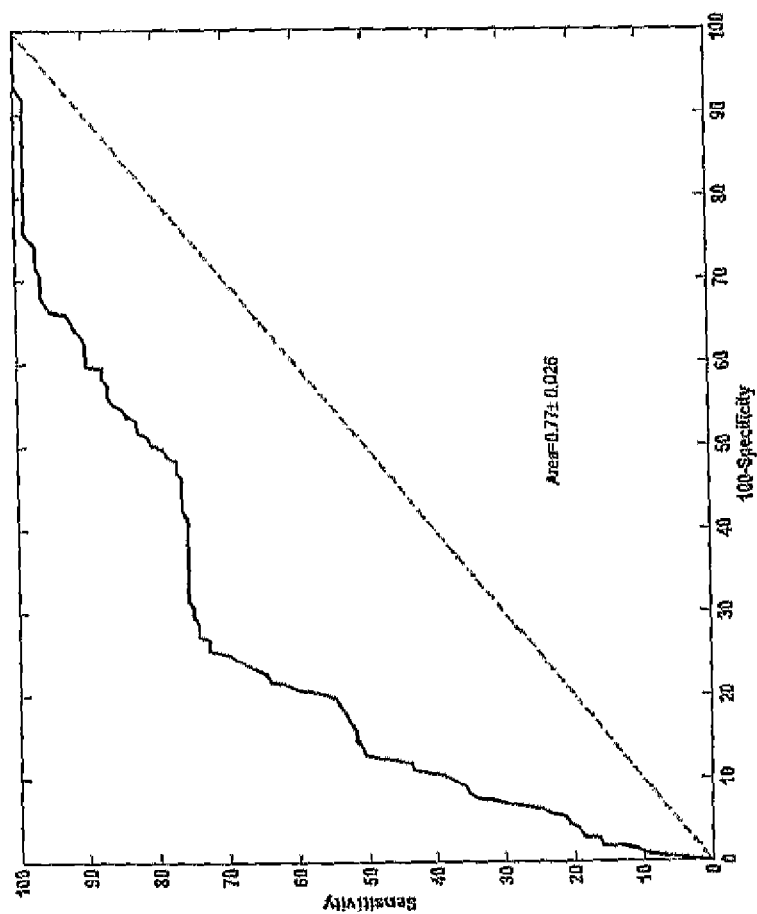
FIG. 7 shows a Receiver Operating Characteristic curve.

FIG. 7 shows the parameter "Receiver Operating Characteristic" (see Hanley et al., Radiology, 143:29:36, 1983) defined as the relationship between sensitivity and 100-specificity. The area under the curve, which is representative of the ability of the method to correctly predict ground truth slices, is 0.77. This value can be determined with an accuracy of ±0.026 (the probability that the correct value of area under the curve is only 0.5 is <0.0001). This implies that the slice parameter R is a fairly good classifier of probable stroke scan slices.

Furthermore, it should be appreciated the present method does not have to assume any particular threshold value (the values b and d are optimised automatically as part of the method), which means that the method remains valid for data derived from different instruments.

Second Stage: Determination of Hemisphere Containing Stroke

In a second stage, the aim is to determine which brain hemisphere contains the stroke. Localization of the stroke hemisphere would further help to reduce the focus of study.

The embodiment does this again using an empirical parameter (the empirical hemisphere parameter", called $R_B$) characterizing a difference in the distribution of percentiles between a hemisphere having a stroke region (a "stroke hemisphere") and a hemisphere without a stroke region (a "non-stroke hemisphere").

The empirical hemisphere parameter $R_B$ is devised to quantify characteristics which are sensitive to the brightest pixels in each of the probable stroke scan slices. The classifying criterion is not based on any threshold value but on the nature (e.g. shape) of the trends. It is assumed that the ischemic stroke is present in only one of the hemispheres and that artefacts are substantially symmetric in both hemispheres.

In a first step (step 21 of FIG. 13), a midsagittal plane of each scan volume is determined, e.g. using software developed by Nowinski et al., Academic Radiology, 13(5) 2006: 652-663. Each of the probable stroke scan slices in a volume is divided into two (left- and right-hemispheres) using the midsagittal plane, resulting in a left-hemisphere pixel set and a right-hemisphere pixel set for each probable stroke scan slice. Normalization of each image slice is performed using equation 1.

Figure 8:
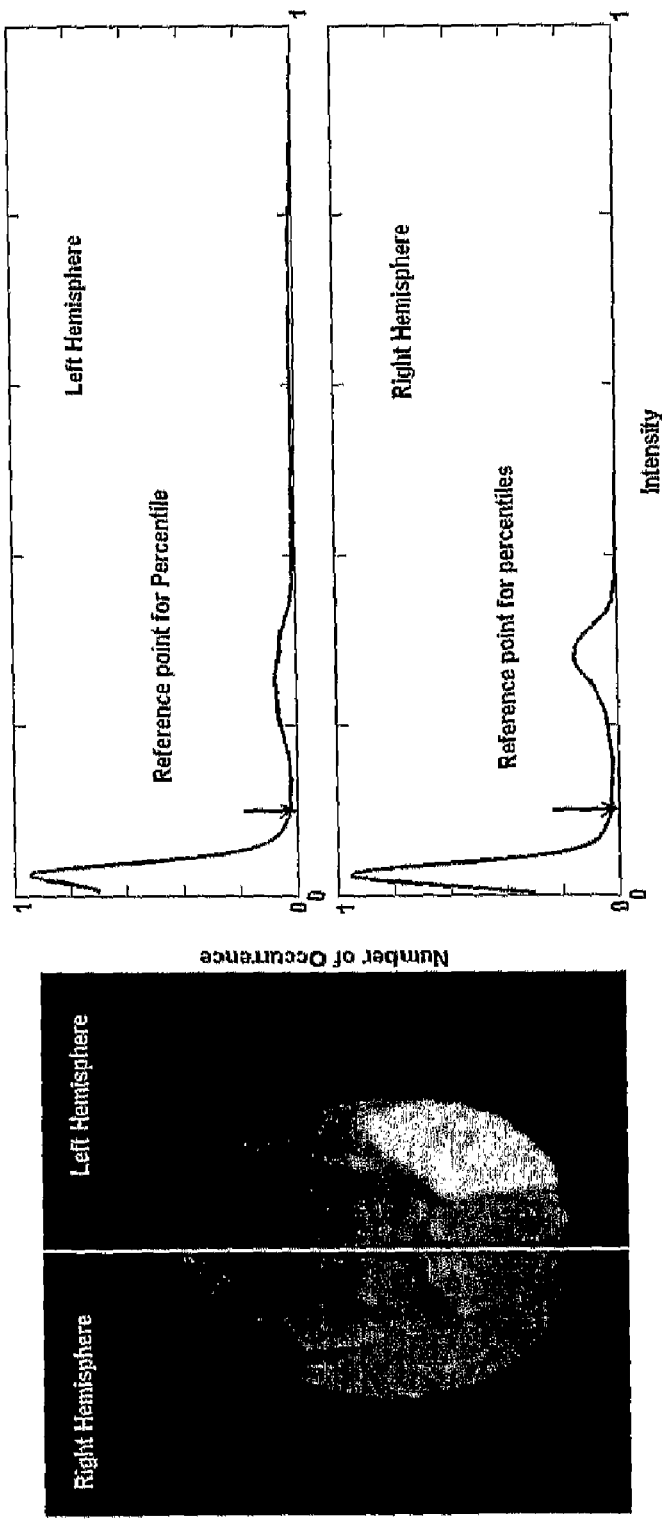
FIG. 8 is composed of FIG. 8(a), which is an image of a right hemisphere without a stroke, FIG. 8(b), which is an image of a left hemisphere with a stroke, and FIGS. 8(c) and 8(d), which are normalized pixel intensity histograms of FIGS. 8(a) and 8(b)

For every probable stroke scan slice, histograms are plotted of the intensities of the left-hemisphere pixel set, and of the intensities of the right-hemisphere pixel set. FIGS. 8(a) and 8(b) are normalized images of the right- and left-hemispheres respectively of a sample probable stroke scan slice. FIGS. 8(c) and (d) show their corresponding normalized pixel intensity histograms. In order to focus on brightest pixel regions indicative of a stroke, a higher reference point for each histogram is selected, such that pixels having an intensity below the reference point are neglected. The reference point is selected to be near a valley 811, 821 at a higher intensity than the respective background peak 813, 823 of each histogram. In a preferred embodiment, the reference point is selected to be 3 σ of the background peak from the background maximum (σ is the standard deviation). This is obtained by approximating the background peak (peak 106 in FIG. 1) to a Gaussian distribution, and obtaining σ from Full Width Half maxima (FWHM) of the background peak. (see the technique explained at http://en.wikipedia.org/wiki/Full_width_at_half maximum, accessed Nov. 13, 2007). We have found that the exact choice for the reference point is not very important, but it should be in or near the valley 811, 821 since choosing a very high reference point will lead to a statistically insignificant number of pixels.

Figure 9:
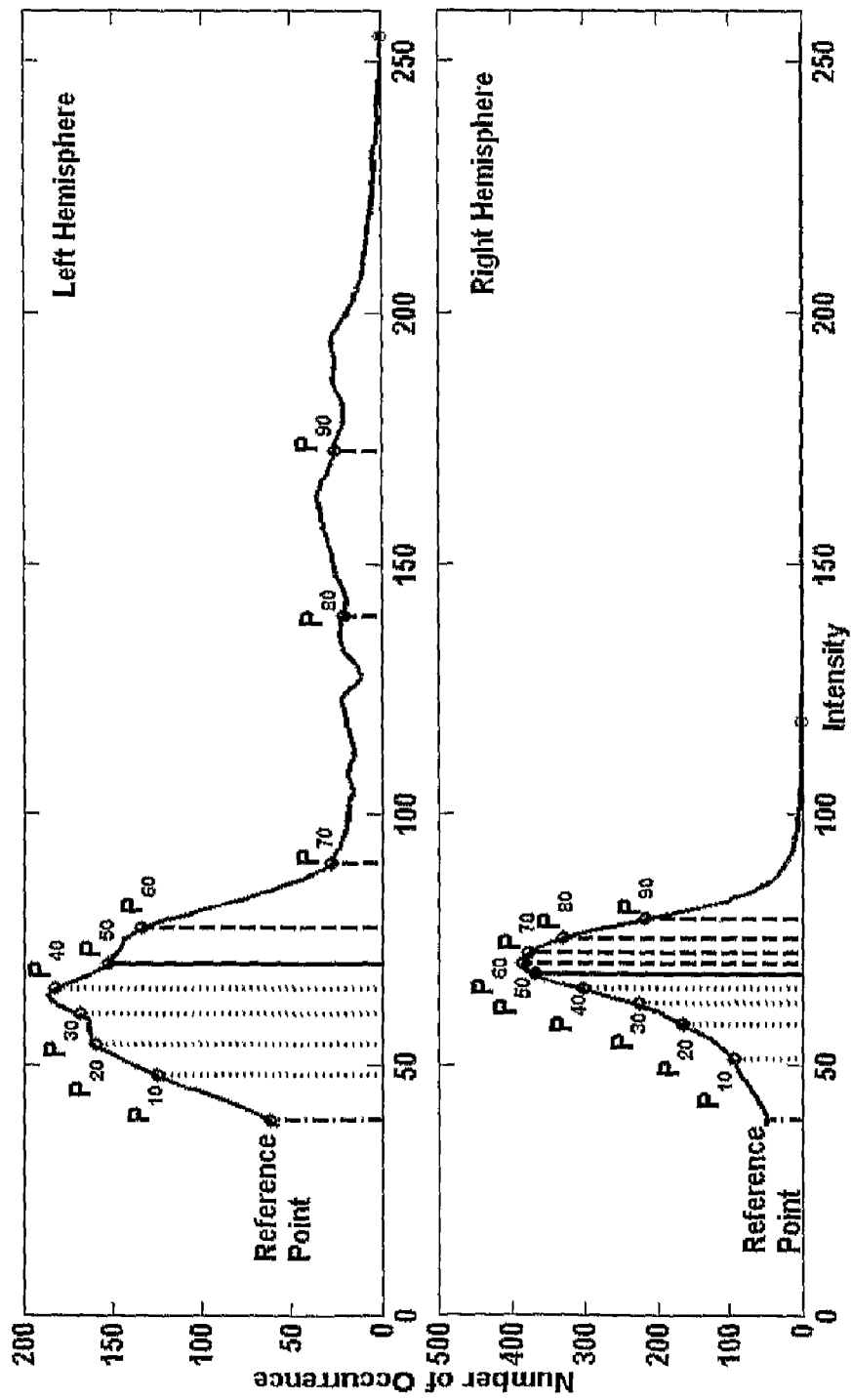
FIG. 9 is composed of FIGS. 9(a) and 9(b), which are portions of the histograms of FIGS. 8(c) and 8(d) with various percentile points marked.

FIGS. 9(*a*) and 9(*b*) are histograms of the intensities of pixels (neglecting pixels with an intensity below the reference point) for the two respective hemispheres. The remaining pixels are used to derive intensity percentiles, which are shown in FIGS. 9(*a*) and 9(*b*) as $P_{10}, P_{20} \ldots P_{90}$. There are very few bright pixels in case of a non-stroke hemisphere (FIG. 8(*a*)), and in FIG. 9(*b*) most of the pixels are concentrated in a middle brightness band 921 characterized by normal tissue regions. By contrast, the histogram for the stroke hemisphere (FIG. 8(*b*)) includes a significant number of pixels in a brightness band 911 with a normalised intensity greater than 100. As can be seen from FIGS. 9(*c*) and 9(*d*), the higher percentiles are well separated in the stroke hemisphere (FIG. 9(*a*)) compared to the non-stroke hemisphere (FIG. 9(*b*)).

Since it is observed that higher percentiles are more separated in stroke regions compared to non-stroke regions, the ratio of the spacing of higher percentiles to the spacing of lower percentiles is greater for stroke hemispheres than non-stroke hemispheres. This ratio can be further enhanced by multiplying by $P_{50}$ since a stroke hemisphere has a higher $P_{50}$.

One suitable empirical hemisphere parameter $R_B$ would thus preferably be defined in equation (3) as:

$$R_B = P_{50}\left(\frac{P_{b+20} - P_b}{P_{d+20} - P_d}\right) \quad (3)$$

where b>50 and d<50. (Note that other possible hemisphere functions can be defined within the scope of the invention. For example, it would be possible to take the exponential of the fraction in Eqn. (3), or of just its numerator).

Figure 10:
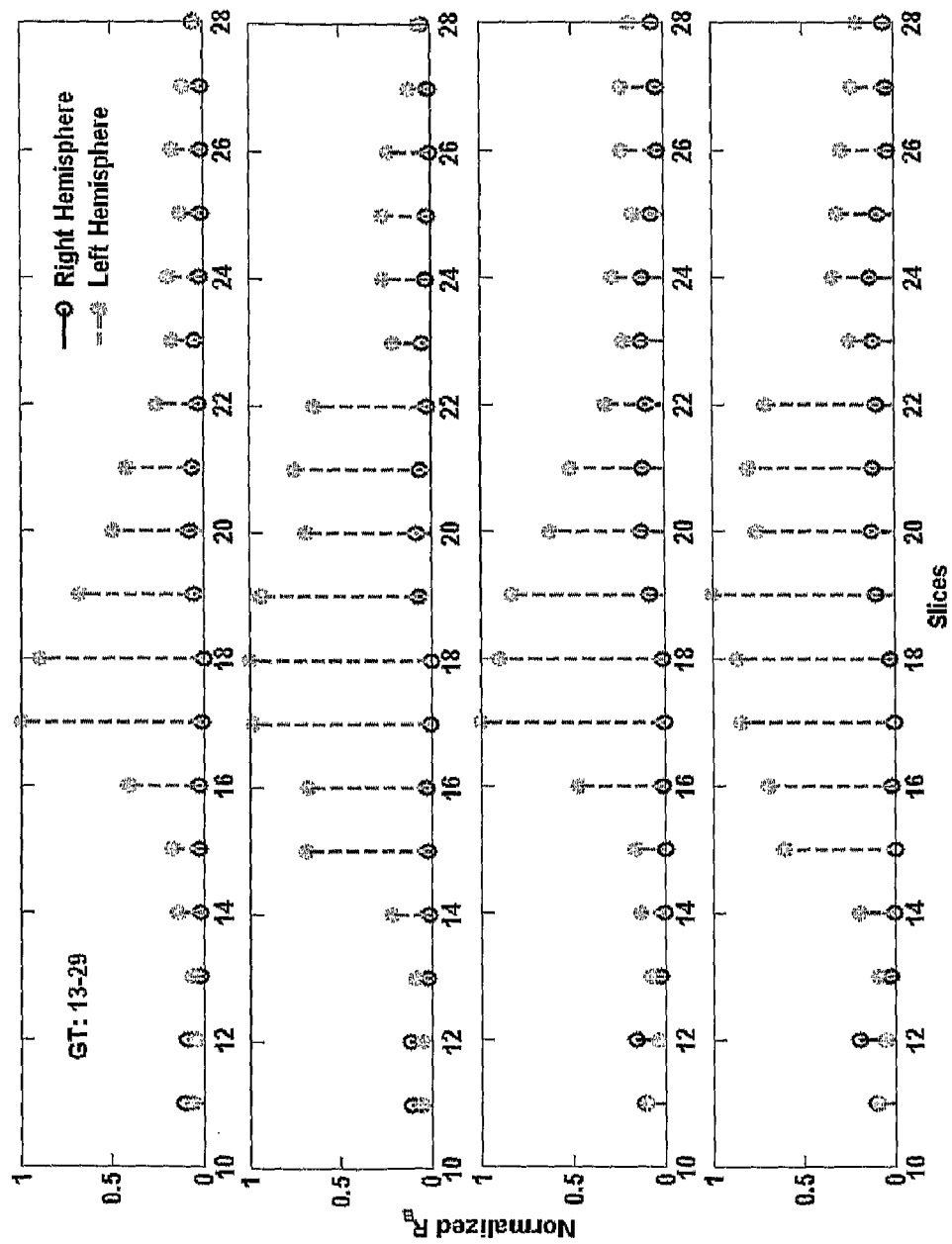
FIG. 10 is a graph depicting the values, for each of the left and right hemisphere, of a parameter, Normalized $R_B$, for different percentile bands for all the probable stroke scan slices.

As for the stage 1 algorithm, equation (3) includes two variables b and d, which may be optimised. Again, table 1 gives four sets of possible selections B1-B4 for the parameters b and d. FIG. 10 includes, for each of these selections, a respective plot 10-1, 10-2, 10-3, 10-4 of the parameter $R_B$ for each hemisphere (step 22 of FIG. 13). Each value $R_B$ is obtained using half of a probable stroke scan slice. The horizontal axis labels the corresponding probable stroke scan slices of the volume scan. $R_B$ is normalized with respect to maximum value of $R_B$ for all probable stroke scan slices amongst both hemispheres in a particular intensity band. This is done in the following way: the normalised $R_B=(R_B-\min[R_B])/(\max[R_B]-\min[R_B])$.

In FIG. 10, black circles 160 represent the right hemisphere and broken gray stems with stars 180 represent the left hemisphere. Normalized $R_B$ is always greater for the left hemisphere, so this hemisphere can be identified as the stroke hemisphere. This is clear from any one of plots 10-1 to 10-4, and thus can be obtained whichever of the intensity bands is used to define $R_B$.

It is interesting to note that the only probable stroke scan slices from which this difference is not evidence (that is slice numbers 11 and 12) are in actual fact not ground truth slices.

By definition, the hemisphere with a higher number of hyperintense pixels is expected to have a larger value of $R_B$. Wilcoxon rank sum test (Gibbons J D., Nonparametric Statistical Inference, 2nd edition, M. Dekker, 1985) (or Mann Whitney U-Test (Mann & Whitney, Annals of Mathematical Statistics, 18, 50-60)) is used to measure the significance of the difference of $R_B$ in both the hemispheres. Depending on the sign of z-statistic (+ (left) or − (right)) corresponding to minimum p-value the infarct hemisphere is identified for all the bands taken together (step 23 of FIG. 13).

The Mann-Whitney test combines and ranks data from two samples, say sample 1 and sample 2, and calculates a statistic on the difference between the sum of the ranks of sample 1 and sample 2. If the resulting two-tailed p-value is small (typically p<0.05) then a statistically significant difference between the two samples medians can be accepted.

Out of the total 36 cases studied, the algorithm correctly identified the stroke hemisphere for 33 cases.

Most of the results have significance values which indicate more than 90% confidence. The low significance in some cases could be due to a contribution of (i) high artifact density, i.e. asymmetric artefact larger than the stroke area, (ii) small stroke area, and/or (iii) false positive slices narrowed by first stage processing. The second stage process fails when there is a huge artifact in the non-stroke hemisphere, e.g. in volume 3, 29 and 33.

Optionally, the significance of the results can be further enhanced by varying the reference point in different directions.

Figure 11:
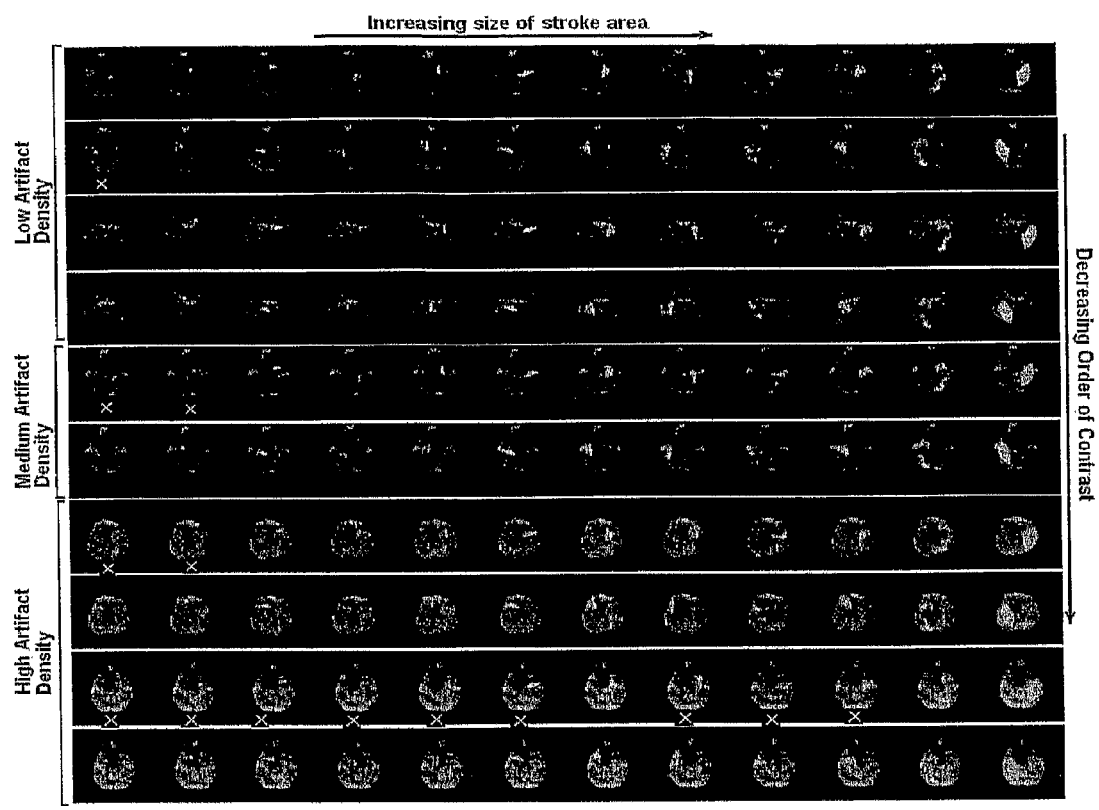
FIG. 11 is shows examples of synthetic scan images having combinations of the same background contrast levels and different stroke types.

Possible sources of error were assessed using a simulated study to identify the stroke hemisphere in 2-dimensions. This was done using synthetic data created with one of five different background contrasts, and one of twelve different types of stroke (lesion, hemorrhage and small to medium stroke areas), with a lesion on the left or right side (as shown for example in FIG. 11). Images with all probable combinations were created such that a total of 120 slices were obtained. The value of hemisphere parameter $R_B$ was calculated for each (2) hemisphere in each slice, i.e., 240 $R_B$ values were obtained. The value of $R_B$ was larger in the stroke hemisphere in 106 out of the 120 images. In the remaining 14 cases, the hemisphere parameter $R_B$ in the stroke hemisphere was almost equal or marginally smaller than $R_B$ in the non-stroke hemisphere. It is understood that this happens mostly when the size of the stroke region is small and the artifact intensity is large.

The above described method is therefore established to be able to significantly identify probable stroke scan slices and to distinguish a stroke hemisphere from a non-stroke hemisphere for a given volume. On a Matlab platform, the proposed algorithm completes the sorting within a few seconds. On other platforms like VC++, this can be reduced to a fraction of a second. The time required for segmentation is thereby reduced, by reducing the initial scan volume and identifying the stroke hemisphere prior to stroke segmentation.

Whilst there has been described in the foregoing description preferred embodiments of the present invention, it will be understood by those skilled in the technology concerned that many variations or modifications in details of design or construction may be made without departing from the present invention. For example, the method may be extended to process scans obtained using other imaging instruments than MR DWI. In fact, it has potential applications in any cases where there is an intensity difference between normal and pathological regions.

In principle, the slice and hemisphere parameters used in the embodiment may have other forms also e.g. the exponential of numerator and log of denominator can also be used for hemisphere detection. Likewise other forms functions of percentiles can be employed.

Other possible variations of the embodiment use other reference points in hemisphere identification selecting the most significant result. Standard deviation is employed above because it is obtained from an overall picture of the data and does not reflect the region of changes of intensity.

Figure 15:
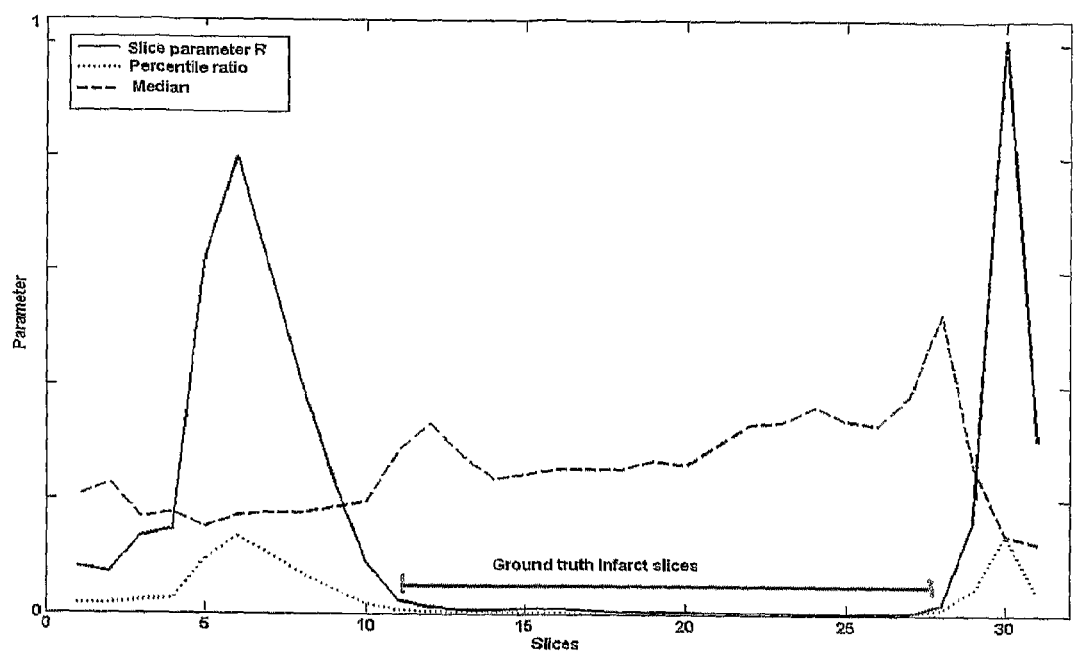
FIG. 15 illustrates the sensitivity of the slice parameter as compared to a median or ratio of difference of percentiles.

The embodiment captures the maximum change of intensity and thus produces significant results. For example, the usefulness of the slice parameter is clear from FIG. 15 which compares the slice parameter with two other possible parameters: the median of the intensity (i.e. $P_{50}$) and the percentile density. The percentile density distribution is more sensitive to the region of occurrence of infarct intensity as compared to the median (e.g., if two infarct regions of same number of pixels occur in two different intensity regions above the median, the median remains unchanged, whereas percentile densities change in the respective region of infarct occurrence). Therefore, using both median intensity and percentile densities (as in the embodiment, which forms the slice parameter using both these median and percentile density) enhances the sensitivity of identification results, as compared to just employing the median intensity, or just the ratio of the difference of percentiles. The robustness of the slice parameter is obtained by the percentile ratio, when compared to using only the median. Using both these characteristics, the embodiment defines two parameters: a slice parameter R and a hemisphere parameter $R_B$. From FIG. 15, we can see a clear distinguishing trend in R as compared to the median or the percentile density ratio. The simple standard deviation would again give an overall picture but would be insensitive to the occurrence of regions of high intensity.

The invention claimed is:

1. A method for identifying, within volume scan comprising a sequence of a plurality of scan slices and in which there is difference of intensity between normal and pathological regions, a subset of said scan slices which include pathological tissue, each scan slice being an image composed of respective intensity values for each of an array of pixels, the method comprising:
   a. obtaining a respective slice parameter for each scan slice using percentiles of the distribution of the intensity of the pixels of the corresponding slices, the slice parameter characterizing the shape of the distribution of intensities of the pixels of a corresponding scan slice;
   b. generating a curve of the slice parameter for a sequence of scan slices; and
   c. identifying said scan slices which include pathological tissue using the curve, as a range of scan slices for which a corresponding slice parameter indicates that there is a relatively high number of high intensity pixels.

2. A method according to claim 1 in which said distribution of intensities excludes pixels having an intensity value below a reference point.

3. A method according to claim 1 in which said slice parameter takes a low value when there are a relatively high number of high intensity pixels, and step (c) is performed by identifying a valley in the curve, and identifying the slices as slices within the valley.

4. A method according to claim 3 in which step (c) is performed by identifying two maxima in the curve, and identifying a range of slices having two end points, both end points being between the two maxima.

5. A method according to claim 4 in which each end point is found by selecting a candidate end point proximate a corresponding one of the maxima and spaced from that one of the maxima in the direction towards the other maximum, and iteratively modifying the candidate end point until a gradient of the slice parameter is below a threshold value.

6. A method according to claim 1, wherein the slice parameter is defined by a function which includes at least one percentile of an intensity distribution as one of its terms.

7. A method according to claim 1, wherein the slice parameter is defined by a function comprising a ratio of a width of a first band of said intensity distribution, and a width of a second band of said intensity distribution, said first band of the intensity distribution being the intensity values of pixels which are in a first percentile range in the intensity distribution, and said second band of the intensity distribution being the intensity values of pixels which are in a second percentile range in the intensity distribution.

8. A method according to claim 7 in which said first and second bands are defined based on one of more band definition variables, step (a) including obtaining a value of the slice parameter for each of a plurality of realizations of one or more band definition variables, step (b) including plotting a respective said curve for each realization of the one or more band definition variables, and step (c) including making said identification using the plurality of curves.

9. A method according to claim 8 in which said identification is made by determining the curve which gives a greatest number of identified slices.

10. A method according to claim 1 in which the scan is an MR DWI scan.

11. A method according to claim 10 in which the pathological tissue is infarct tissue.

12. A method according to claim 1 in which the scan is of a brain.

13. A computer system comprising a processor arranged to perform a method according to claim 1.

14. A computer program product comprising a non-transitory recording medium storing computer program instructions operative to cause a computer program to perform a method according to claim 1.

15. A method for determining, within a volume scan of a brain comprising a sequence of scan slices and in which there is difference of intensity in normal and pathological regions like, which hemisphere of the brain contains the pathological region, the method comprising:
   a. selecting a plurality of scan slices from said sequence of scan slices by:
      i. obtaining a respective slice parameter for each scan slice using percentiles of the distribution of the intensity of the pixels of the corresponding scan slices, the slice parameter characterizing the shape of the distribution of the intensities of the pixels of the corresponding scan slice;
      ii. generating a curve of the slice parameter for the sequence of scan slices; and
      iii. selecting said scan slices which include pathological tissue using the curve, as a range of scan slices for which the corresponding slice parameter indicates that there is a relatively high number of high intensity pixels;
   b. dividing each of the selected scan slices into a left-hemisphere pixel set and a right-hemisphere pixel set;

c. obtaining a respective hemisphere parameter for each of the left-hemisphere and right-hemisphere pixel sets of each selected scan slice, the hemisphere parameter characterizing the distribution of the intensities of pixels of the corresponding scan slice in the corresponding hemisphere; and d. determining whether the pathological region is in the left hemisphere or the right hemisphere according to whether an average of the hemisphere parameter over the selected scan slices is higher for the left-hemisphere pixel sets or the right-hemisphere pixel sets.

16. A method according to claim 15 in which said distribution of intensities excludes pixels having an intensity value below a reference point.

17. A method according to claim 16 in which the reference point is selected to exclude a low intensity peak in the intensity distribution.

18. A method according to claim 16 in which the scan is an MR DWI scan.

19. A method according to claim 18 in which the pathological tissue is infarct tissue.

20. A method according to claim 15, wherein the hemisphere parameter is defined by a function which includes at least one percentile of the intensity distribution as one of its terms.

21. A method according to claim 15, wherein the hemisphere parameter is defined by a function comprising a ratio of a width of a first band of said intensity distribution, and a width of a second band of said intensity distribution, said first band of the intensity distribution being intensity values of pixels which are in a first percentile range in the intensity distribution, and said second band of the intensity distribution being intensity values of pixels which are in a second percentile range in the intensity distribution.

22. A method according to claim 21 in which said first and second bands are defined based on one of more band definition variables, step (b) including obtaining a value of the hemisphere parameter for each of a plurality realizations of one or more band definition variables, and in step (c) said average being in accordance with an average over said realizations.

23. A method according to claim 21 in which said function also depends upon a median of the intensity distribution.

24. A computer system comprising a processor arranged to perform a method according to claim 15.

25. A computer program product comprising a non-transitory recording medium storing computer program instructions operative to cause a computer program to perform a method according to claim 15.

* * * * *